United States Patent
Altmann et al.

(10) Patent No.: US 7,172,285 B1
(45) Date of Patent: Feb. 6, 2007

(54) CONTACT LENS WITH HIGH-ORDER COMPENSATION FOR NON-AXISYMMETRIC STRUCTURE

(75) Inventors: Griffith E. Altmann, Pittsford, NY (US); Ian G. Cox, Honeoye Falls, NY (US); Timothy Green, Rochester, NY (US); William T. Reindel, Webster, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 0 days.

(21) Appl. No.: 11/164,898

(22) Filed: Dec. 9, 2005

(51) Int. Cl.
G02C 7/04 (2006.01)
(52) U.S. Cl. .................. 351/160 R; 351/177
(58) Field of Classification Search ............ 351/160 R, 351/161, 177
See application file for complete search history.

(56) References Cited

U.S. PATENT DOCUMENTS

| | | |
|---|---|---|
| 4,637,697 A | 1/1987 | Freeman |
| 6,113,236 A | 9/2000 | Chapman et al. |
| 6,499,843 B1 | 12/2002 | Cox et al. |

OTHER PUBLICATIONS

Lopez-Gil et al., Generation of third-order spherical and coma aberrations by use of radially symmetrical fourth-order lenses; vol. 15, No. 9/Sep. 1998/J. Opt. Soc. Am, A.
Salmon, A Primer on Using Wavefront Analysis for Refractive Surgery and Other Opthalmic Applications, Cope Certificate 10260-RS, Expires Dec. 1, 2006.
Wyant et al., Basic Wavefront Aberration Theory for Optical Metrology, Applied Optics and Optical Engineering, vol. XI.
Vilupuru et al., Spatially variant changes in lens power during ocular accommodation in a rhesus monkey eye, vol. 4, No. 4, Article 6, pp. 299-309.
Trusit, Wavefront aberrometry, Part I: Current theories and concepts, Nov. 19, 2004.
Globerson et al., Comparison of Refraction Derived from Z-View™ Wavefront Aberrometer Measurement and Subjective Refraction, Presented at the 2004 Annual Meeting of the American Academy of Optometry.
Thibos, et al., A Statistical Model of the Aberration Structure of Normal, Well-Corrected Eyes, Submitted to Opthalmic and Physiological Optics, Apr. 18, 2002, Revised May 14, 2002.
Marcos, et al., Measurement of the wave-front aberration of the eye by a psychophysical procedure, © 1998 Optical Society of America, V. 15, No. 9, Sep. 1998, 2449-2456.
Atchison, Recent advances in representation of monochromatic aberrations of human eyes, Clinical and Experimental Optometry 87.3 May 2004, 138-148.
Encyclopedia: Eyeglass prescription, nationmaster.com.
DeFranco, Multifocal Contact Lenses, All About VISION.com.
Project 1—The Ultimate Contact Lens, CRCERT_research.

*Primary Examiner*—Scott J. Sugarman
*Assistant Examiner*—Darryl J. Collins
(74) *Attorney, Agent, or Firm*—John E. Thomas

(57) ABSTRACT

Contact lenses, such as prism ballasted toric lenses, having anterior and posterior surfaces related by way of non-axisymmetric thickness variation can exhibit a third-order aberration, particularly vertical coma. A wavefront modifier, such as an aspheric surface modification, is incorporated into the lenses to at least partially compensate for the wavefront aberration associated with the non-axisymmetric thickness variation. A magnitude of the modifications can be adjusted to set a target value for any remaining wavefront aberration of the lenses based on a population-wide goal.

42 Claims, 2 Drawing Sheets

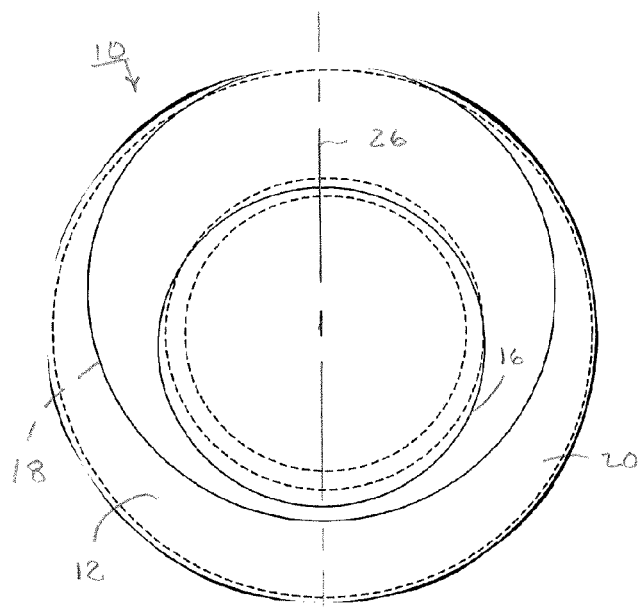
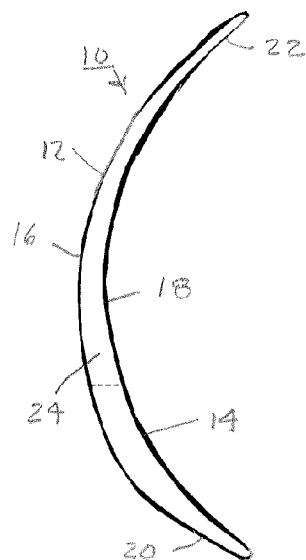
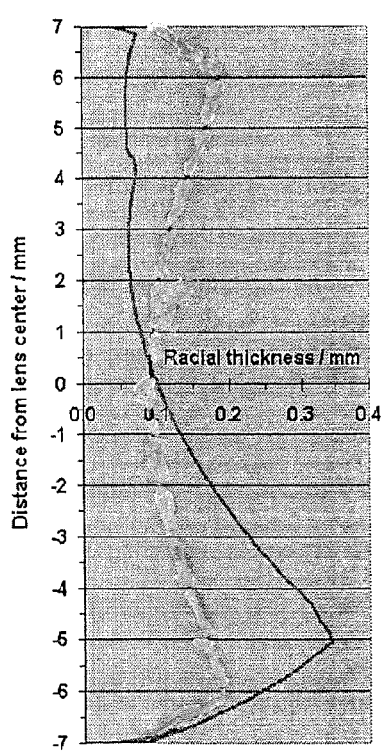

CONTACT LENS WITH HIGH-ORDER COMPENSATION FOR NON-AXISYMMETRIC STRUCTURE

FIELD OF THE INVENTION

The invention relates to contact lenses and other ophthalmic biomedical devices incorporating non-axisymmetric structural features, such as prism ballasting, and to optical modifications of such lenses and devices compensating for related optical aberrations.

BACKGROUND OF THE INVENTION

Optical corrections for conditions such as presbyopia and astigmatism are referenced to particular angular orientations about an optical viewing axis. Stacked focal segments for treating presbyopia have different powers spaced along a common vertical axis. Cylindrical optical corrections for treating astigmatism distinguish optical powers in two orthogonal directions oriented with respect to a common cylindrical axis. To achieve the desired optical corrections, the vertical axis of the presbyopia correction and cylindrical axis of the astigmatism correction must be angularly oriented as intended about the optical viewing axis. Contact lenses for making such corrections generally incorporate some type of ballasting to maintain a preferred angular orientation of the lenses about the optical viewing axis while mounted on wearers' eyes.

One or more sections of the lenses can be made thicker or thinner than other sections of the lenses to provide the ballast. For example, anterior surfaces can be decentered inferiorly with respect to posterior surfaces of the lenses to achieve a thickness variation that increases along a vertical meridian from the superior to the inferior portions of the lenses (i.e. the inferior portions are thicker than the superior portions).

So-called "toric contact lenses" include toric optical zones that correct for refractive abnormalities associated with astigmatism. The prescriptions of such lenses typically specify a second-order spherical correction, referred to as power, together with both a second-order cylindrical correction and a rotational angle specifying an angular offset of a cylindrical axis from an orientation axis of the ballast. Toric contact lens prescriptions typically specify the angular offset in 5-degree or 10-degree increments, ranging from 0 degrees to 180 degrees.

Multi-focal contact lenses can also require similar ballasting, where the different focusing sections of the lenses are stacked in a particular direction. For example, bifocal or progressively focusing contact lenses can have focusing powers that vary along a vertical meridian of the lenses between superior and inferior portions of the lenses and can require some form of ballasting to maintain the desired vertical orientation on wearers' eyes. A ballasting that progressively varies the thickness of the lenses along the same vertical meridian can be used for this purpose. The different focusing sections of the oriented lenses can include separate corrections for astigmatism.

The progressive variation in thickness along the vertical meridian of the lenses tends to exhibit a so-called "prism" effect through an optical zone, producing a slight shift in focus position. As an optical effect, the shift is small and, normally, can be readily accommodated by wearers' natural vision systems. However, in addition to the slight shift in focus position, the directed thickness variation also tends to produce higher-order aberrations, particularly vertical coma, which is a third-order effect. Such higher-order aberrations can reduce imaging performance, especially under lower light conditions. In general, the higher-order aberrations tend to increase in significance with pupil size.

SUMMARY OF INVENTION

The invention in one or more of its preferred embodiments compensates for the directed thickness variations of contact lenses, such as prism ballast, or for other non-axisymmetric structural features of contact lenses that contribute wavefront aberrations. A wavefront modifier can be incorporated into the lenses to at least partially compensate for the wavefront aberrations associated with the non-axisymmetric structural features. The amount of compensation is preferably based on one or more global targets. For example, a third-order wavefront modification can be incorporated into the contact lenses to counteract a related third-order optical effect of the asymmetric structural features, targeting a net zero third-order wavefront aberration of the lenses. Alternatively, a different magnitude third-order wavefront modification can be incorporated, targeting a net non-zero third-order wavefront aberration of the lenses for such purposes as influencing population-wide vision characteristics. Although statistical data from various identified populations can be used to inform the choice of global targeting for residual wavefront aberrations of the lenses, the structurally compensating wavefront modifications can be incorporated into contact lenses fulfilling a range of prescriptions independently of any higher-order aberrations exhibited by the natural vision systems of individual contact lens wearers.

Thus, the improved contact lenses envisioned by the invention can incorporate third-order wavefront modifications at least partially compensating for their non-axisymmetric structural features without measuring the third-order visual performance of individual contact lens wearers. The wavefront modifications preferably remove adverse optical effects of non-axisymmetric structural features. However, the higher-order corrections can also target population-wide goals for higher-order effects, such as compensating for statistically significant higher-order aberrations exhibited by definable population groups. One or more combinations of characteristics including optical prescription data, eye fitting data, age, gender, or medical history can define such groups.

One version of the invention as a method of making a contact lens includes forming a contact lens body having anterior and posterior surfaces aligned along an optical axis for producing spherical or cylindrical corrections. The anterior and posterior surfaces are related by way of a non-axisymmetric thickness variation about the optical axis to incorporate an orienting feature for orienting the contact lens body about the optical axis. One or more optical defects associated with the non-axisymmetric thickness variation are identified. At least one of the anterior and posterior surfaces is fashioned as a wavefront modifier that at least partially compensates for the optical defect associated with the non-axisymmetric thickness variation.

The optical defect is preferably identified as a non-axisymmetric wavefront aberration associated with the thickness variation. Generally, the associated optical defect includes a third-order wavefront aberration. For example, a form of coma, such as vertical coma, can be associated with the thickness variation. The wavefront modifier is preferably arranged to at least partially compensate for the vertical coma associated with the thickness variation. The arrangement can include incorporating the wavefront modifier in the anterior surface of the contact lens body. In addition, the thickness variation, in combination with the spherical or cylindrical corrections, can produce a plurality of other higher-order aberrations, and the wavefront modifier can be arranged to at least partially compensate for the other higher-order aberrations as well.

Another version of the invention as a method of making a contact lens includes forming a contact lens body with a non-axisymmetric thickness variation for orienting the contact lens body about an optical axis. An optical aberration associated with the non-axisymmetric thickness variation is identified, and optical properties of the contact lens body are modified to at least partially compensate for the identified optical aberration associated with the thickness variation.

The optical aberration can be identified as a third-order wavefront aberration, such as vertical coma, exhibited by transmissions through the lens body along the optical axis. The optical properties of the contact lens body are modified to at least partially compensate for the third-order wavefront aberration. For example, the lens body preferably includes anterior and posterior surfaces, and at least one of the anterior and posterior surfaces can be modified to at least partially compensate for the identified optical aberration associated with the thickness variation. As an alternative or addition to shaping the anterior and posterior surfaces, a variation in a refractive index can be incorporated into the lens body to at least partially compensate for the identified optical aberration. The variation in refractive index is preferably a non-axisymmetric variation in refractive index.

Another version of the invention as a batch of contact lenses includes a plurality of lens bodies having anterior and posterior surfaces that are aligned along an optical axis for producing spherical or cylindrical corrections. The anterior and posterior surfaces are related by way of non-axisymmetric thickness variations for orienting the contact lens bodies about the optical axis. Wavefront modifiers incorporated into at least one of the anterior and posterior surfaces of the lens bodies at least partially compensate for a wavefront aberration associated with the non-axisymmetric thickness variations by targeting a common value for any remaining wavefront aberration among the lens bodies.

The wavefront aberration can include a third-order wavefront aberration, and the common target value among the lens bodies is a predetermined amount of the third-order wavefront aberration. The predetermined amount of the common target value among the lens bodies can be a zero amount of the third-order wavefront aberration. Alternatively, the common target value among the lens bodies can be an amount based on a population study to compensate for a similar third-order aberration exhibited by the population. The wavefront aberration can be coma, and the common target value can be a predetermined amount of coma. The wavefront modifiers are incorporated into at least one of the anterior and posterior surfaces as non-axisymmetrical surface forms that at least partially compensate for the wavefront aberration associated with the thickness variation.

Another version of the invention as a plurality of contact lenses includes a plurality of contact lens bodies each incorporating a structural feature contributing a third-order wavefront aberration to wavefront propagations through the contact lens bodies. A wavefront modifier incorporated into each of the contact lens bodies contributes a complementary third-order wavefront aberration such that in combination with the third-order wavefront aberration contributed by the structural feature, any residual third-order wavefront aberration is substantially the same among the lens bodies.

The structural features incorporated into the lens bodies can contribute different amounts of the third-order wavefront aberration, but amounts of the residual third-order wavefront aberration preferably remain substantially the same. At least some of the lens bodies preferably exhibit different amounts of optical power but also preferably exhibit substantially the same amount of the residual third-order wavefront aberration. The residual third-order wavefront aberration can be substantially null.

The structural features can provide for orienting the contact lens bodies on wearers' eyes. For example, the lens bodies can be prism ballasted for orienting the lens bodies on the wearers' eyes, and the wavefront modifiers at least partially compensate for optical aberrations associated with the prism ballasting. For example, the wavefront modifiers can contribute non-axisymmetrical aberrations with respect to optical axes of the wearers' eyes. In particular, the wavefront modifiers can compensate for vertical coma associated with the prism ballasting. The wavefront modifiers can be formed in the anterior or posterior surfaces of the lens bodies and are preferably formed in the anterior surfaces.

Another version of the invention as a set of ophthalmic biomedical optics includes a plurality of focusing optics having bodies adapted for contact with biological tissue and a non-axisymmetric structural feature of the focusing optic bodies that influences optical transmissions of the lens bodies. A wavefront modifier further influences optical transmissions of the focusing optic bodies. The wavefront modifier exhibits a third-order aberration that makes similar improvements to the imaging performance of the focusing optic bodies.

The non-axisymmetric structural feature can contribute a third-order aberration, and the wavefront modifier at least partially compensates for the third-order aberration of the orienting feature. The wavefront modifier also preferably compensates for a plurality of other higher-order aberrations to improve imaging performance. For example, the wavefront modifier can provide corrections for both coma and spherical aberration. Preferably, the wavefront modifier is formed in one of the anterior and posterior surfaces as a non-axisymmetrical surface variation. However, the wavefront modifier can also be formed at least in part by refractive index variations in the focusing optic bodies.

BRIEF DESCRIPTION OF THE DRAWING FIGURES

FIG. 1 is a front view of a toric lens showing different zones affecting both the lens's performance and cross-sectional shape.

FIG. 2 is a side cross-sectional view of the toric lens taken along a vertical diameter corresponding to a ballast axis.

FIG. 3 is a graph of an intended thickness variation of the lens along the ballast axis.

Figure 4A:
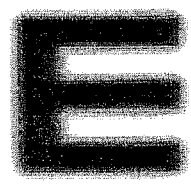
Figure 4B:
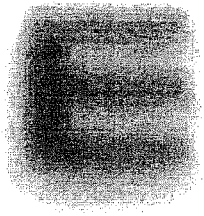

FIGS. 4A and 4B compare diffraction limited and aberrated images showing an effect of vertical coma.

Figure 5:
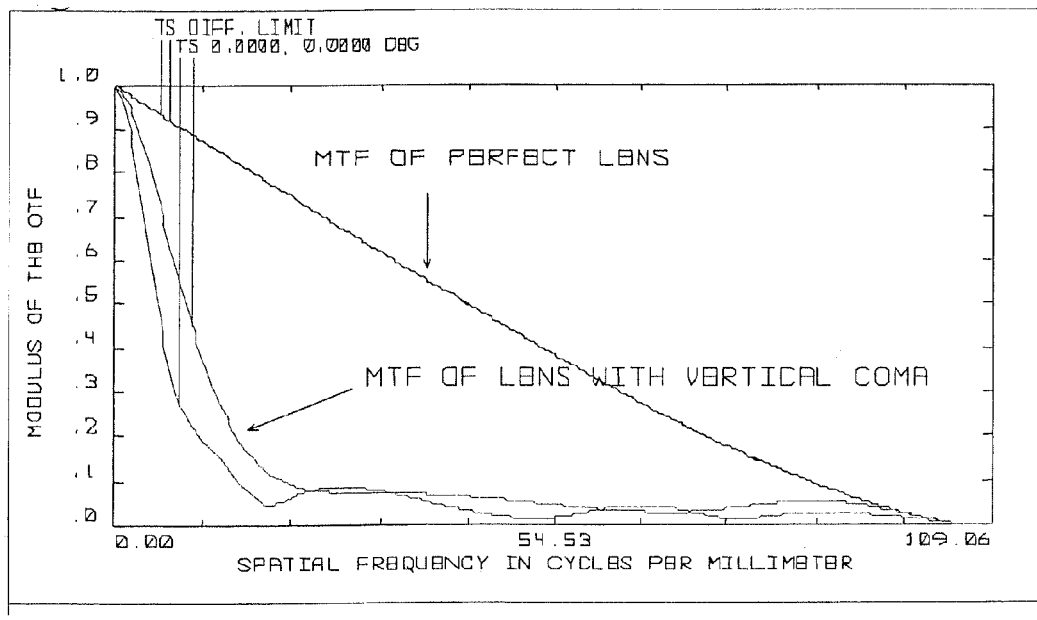

FIG. 5 is a graph of a modulation transfer function showing an effect of vertical coma on the degree of contrast at different spatial frequencies.

DETAILED DESCRIPTION

Multifocal and toric contact lenses are among the types of contact lenses requiring an associated angular orientation to function as designed. Such angularly sensitive contact lenses are typically formed with some type of ballast to favor a particular orientation of the lenses on wearers' eyes. The ballast sets a neutral angular orientation of the lenses; and angularly sensitive prescriptions, such as the angular orientation of cylindrical axes for fitting astigmatism, are referenced with respect to this neutral orientation.

Typically, the lenses are made with a thickness variation along a so-called ballast axis, which sets the neutral orientation of the lenses. As shown in FIGS. 1 and 2, the thickness variation of a typical toric lens 10 can be achieved by relatively vertically offsetting anterior lens surface 12 with respect to posterior lens surface 14. The offset affects the central zones 16 and 18 of the anterior and posterior lens surfaces 12 and 14 as well as their corresponding peripheral zones 20 and 22, resulting in a directional thickness variation of the lens body 24. Additional details of such toric contact lenses are given in commonly assigned U.S. Pat. No. 6,113,236, which is hereby incorporated by reference.

The graph of FIG. 3 shows a typical thickness variation taken through a vertical meridian of the lens aligned with the intended ballast axis 26. Although the thickness profile is affected by additional factors, including spherical and cylindrical corrections, the thickness profile tends to progressively increase in a direction from superior to inferior portions of the lens 10. The progressive thickness variation extends through the intended optical zone of the lens and influences light propagations through the lens largely as an optical prism effect, which can be measured as a first order Zernike polynomial term for vertical prism (i.e., $Z_1^{-1}$). The associated angular image displacement is relatively minor and readily accommodated by the wearers' natural vision systems.

However, we have found that the thickness variation is also optically manifest as a higher-order aberration, particularly as a third-order aberration, such as vertical coma (i.e., Zernike term $Z_3^{-1}$). Magnitudes of vertical coma attributable to conventional ballasting are expected to be in a range of approximately 0.1 microns to 0.3 microns over a 6.0 mm optical zone. FIGS. 4A and 4B contrast a diffraction-limited simulated image of the letter "E" subtending an angle of 5 arc minutes with a similarly sized simulated image of the letter "E" exhibiting 0.1 microns of vertical coma through a 6.0 millimeter pupil. The image quality of the letter "E" is reduced by the vertical coma.

One conventional toric lens with a prescription of −3.00 diopter spherical and −1.5 diopter cylindrical at an axis of 0 degrees can exhibit a vertical coma of 0.184 microns over a 6 millimeter optical zone. The reduction in imaging performance associated with the vertical coma of the conventional toric lens is apparent in the graph of FIG. 5 in which the modulus of the optical transfer function is significantly reduced with respect to an ideal lens at lower spatial frequencies.

Despite the demonstrable deterioration of optical performance associated with vertical coma, the effect of vertical coma on visual acuity is less apparent. Conventional visual acuity tests are based on incremental scales that may lack appropriate resolution to measure the effects of small amounts of vertical coma. Other higher-order aberrations in the lenses or in the wearers' natural vision systems may also mask differences within a single higher-order term. Nonetheless, controlling the resulting third or other higher order aberrations associated with non-axisymmetric structural features, such as prism ballast, reduces intrinsic errors and improves imaging performance, which are both important for optimizing the capabilities of such corrective lenses.

For controlling the measured or otherwise calculated vertical coma associated with prism ballast, at least one of the anterior or posterior surfaces 12 or 14 of the contact lens 10 is formed as a non-axisymmetric asphere. Preferably, the asphere is formed in the anterior surface 12 to reduce effects on fit. A sag function of the anterior surface is given by the following equation:

$$SAG = \frac{\left[\frac{x^2}{R}\right]}{\left[1 + \sqrt{\left(1 - (1+K)\left(\frac{x}{R}\right)^2\right)}\right]} + Z_3^{-1}\left[3\left(\frac{x}{NR}\right)^3 - 2\left(\frac{x}{NR}\right)\right]\sin Q$$

where R is the apical radius of the surface in millimeters, K is the conic constant of the surface and has no units, X is the radial position in millimeters, $Z_3^{-1}$ is the Zernike coefficient for vertical coma in millimeters, NR is the normalization radius for the Zernike coefficient, and Q is the azimuthal position in degrees.

The Zernike coefficient $Z_3^{-1}$ for vertical coma can be chosen to compensate for the vertical coma induced by the prism ballast so that a net vertical coma of the compensated lens is either zero or non-zero, depending on the global target value for the lens. Zero target values require the aspheric surface correction to counteract the measured or otherwise calculated value for vertical coma so that the combined effect is to remove vertical coma from the lens. Non-zero target values leave a desired amount of vertical coma of the same or opposite sign to counteract a population-wide aberration or other condition of use.

Although studies have shown that little overall bias for vertical coma is found in the general population, it may be possible to identify more specific populations or conditions of use where a measured amount of vertical coma would be beneficial. The identified populations could be defined by various criteria including age, gender, medical and history, as well as by conventional prescription parameters.

Contact lenses are typically made in batches and organized into stock-keeping units (SKUs) distinguishing a wide range of optical prescriptions for spherical and cylindrical corrections as well as fitting parameters. Preferably, each such prescription is associated with just one or possibly two target values for vertical coma. A single target value of vertical coma for each prescription, even if the target value varies among the prescriptions, does not add to the number of SKUs that must be maintained for meeting the desired range of conventional prescriptions. A second available target value of vertical coma for each prescription would double the total number of SKUs that must be maintained and require a further election (i.e., a choice between the target values) among the available prescriptions.

The desired compensation for the prism ballast can also include other third-order (e.g., trefoil) or even higher order terms as well as lower order terms to maintain the desired spherical and cylindrical corrections. The compensation for prism ballast can also be combined with compensations for other structural features that contribute wavefront aberrations, including axisymmetric structural features that can contribute aberrations such as spherical aberration ($Z_4^0$). Non-zero target values can also be set to compensate for the other aberrations, such as spherical aberration, to meet skewed population distributions for the aberration or for aspheric fitting characteristics recognized in the population.

The target values for the wavefront aberrations can match certain population-wide goals. However, the invention is primarily directed to compensating for non-axisymmetric structural features of the lenses so as to meet limited number of target values for the associated wavefront aberrations. Other wavefront aberrations or targeted wavefront aberrations, including other sources of vertical coma, can be accommodated in the lens design. For example, combinations of spherical aberration and decenter can produce third-order aberrations, such as coma.

Preferably, reshaping one or both of the anterior and posterior surfaces 12 and 14 of the lens 10 achieves the desired compensation. Once the surface modifications are defined, such as by their associated Zernike terms, the lens surfaces can be reshaped by various conventional means including lathes, laser sculpting, or molding as is preferred for incorporating the desired wavefront modifications into batch manufacturing of the lenses.

Refractive index variations can also be incorporated into the lens body 24 to further influence the required wavefront modifications required to compensate for the non-axisymmetric structural features. For example, a refractive index variation can be made in the lens body 24 along a vertical meridian between the superior and inferior portions of the lens. Photosensitive optical materials could be incorporated into the lens body 24 and exposed for varying their refractive index. The lenses could also be formed with additional optical interfaces or in multiple layers for further reshaping wavefronts.

A set of contact lenses incorporating a wavefront modifier to compensate for a non-axisymmetric structural feature can be based on continuous wear toric prism-ballasted contact lenses available from Bausch and Lomb Incorporated under the trade name PureVision Toric. The considered lenses are cast using a polypropylene mold resin and a balafilcon A copolymer and have a sphere power of –3.00 diopters. Lens dimensions for three different targets for resulting vertical coma are presented in the table below.

| Nominal Vertical Coma (mm) | Center Thickness (mm) | Diameter (mm) | Sag (mm) | Edge Thickness (mm) | Ballast Thickness (mm) | Equivalent Base Curve (mm) |
|---|---|---|---|---|---|---|
| −0.08 | 0.085 | 13.98 | 3.63 | 0.096 | 0.347 | 8.67 |
| +0.22 | 0.098 | 14.02 | 3.63 | 0.096 | 0.328 | 8.72 |
| 0.00 | 0.097 | 14.01 | 3.63 | 0.093 | 0.337 | 8.72 |

The aspheric alteration of the anterior surfaces of the lenses is not expected to result in any centration, orientation, or comfort issues. While achieving the desired target values for vertical coma, it may also be necessary to target other higher-order aberrations to assure that the intended benefits of the vertical coma correction are not counterbalanced or overpowered by the other higher-order aberrations.

Although the invention has been described with respect to certain exemplary embodiments, other modifications will be readily apparent to skilled practitioners of this art in accordance with the overall teaching of this invention. For example, although the invention is primarily directed to improvements in contact lenses, other ophthalmic biomedical optics having non-axisymmetric structural features affecting imaging performance could also benefit from the invention.

What is claimed is:

1. A method of making a contact lens, comprising the steps of:
    forming a contact lens body having anterior and posterior surfaces aligned along an optical axis for producing spherical or cylindrical corrections;
    relating the anterior and posterior surfaces by way of a non-axisymmetric thickness variation to incorporate an orienting feature for orienting the contact lens body about the optical axis;
    identifying an optical defect associated with the non-axisymmetric thickness variation of the orienting feature; and
    fashioning at least one of the anterior and posterior surfaces as a wavefront modifier that at least partially compensates for the optical defect associated with the non-axisymmetric thickness variation.

2. The method of claim 1 in which the step of identifying includes identifying the optical defect as a non-axisymmetric wavefront aberration associated with the thickness variation.

3. The method of claim 2 in which the step of identifying includes identifying coma associated with the thickness variation.

4. The method of claim 3 in which the step of fashioning includes arranging the wavefront modifier to at least partially compensate for the coma associated with the thickness variation.

5. The method of claim 1 in which the step of identifying includes identifying the optical defect as including a third-order wavefront aberration.

6. The method of claim 5 in which the step of fashioning includes arranging the wavefront modifier to at least partially compensate for the third-order wavefront aberration.

7. The method of claim 6 in which the step of fashioning includes incorporating the wavefront modifier in the anterior surface of the contact lens body.

8. The method of claim 1 in which the thickness variation in combination with the spherical or cylindrical corrections produces a plurality of higher-order aberrations, and the steps of identifying and fashioning include identifying the higher-order aberrations as defects and arranging the wavefront modifier to at least partially compensate for the higher-order aberrations.

9. A method of making a contact lens, comprising steps of:
    forming a contact lens body having a non-axisymmetric thickness variation for orienting the contact lens body about an optical axis;
    identifying an optical aberration associated with the non-axisymmetric thickness variation; and
    modifying optical properties of the contact lens body to at least partially compensate for the identified optical aberration associated with the thickness variation.

10. The method of claim 9 in which the step of identifying includes identifying the optical aberration as vertical coma exhibited by transmissions through the lens body along the optical axis.

11. The method of claim 10 in which the step of modifying includes modifying optical properties of the contact lens body to at least partially compensate for the vertical coma associated with the thickness variation.

12. The method of claim 9 in which the step of identifying includes identifying the optical aberration as including a third-order wavefront aberration.

13. The method of claim 12 in which the step of modifying includes modifying optical properties of the contact lens body to at least partially compensate for the third-order wavefront aberration.

14. The method of claim 9 in which the step of forming includes forming anterior and posterior surfaces of the lens body, and the step of modifying includes modifying at least one of the anterior and posterior surfaces to at least partially compensate for the identified optical aberration associated with the thickness variation.

15. The method of claim 9 in which the step of modifying includes incorporating a variation in a refractive index of the lens body to at least partially compensate for the identified optical aberration.

16. The method of claim 15 in which the variation in refractive index is a non-axisymmetrical variation in refractive index.

17. A batch of contact lenses, comprising:
a plurality of lens bodies having anterior and posterior surfaces that are aligned along an optical axis for producing spherical or cylindrical corrections;
the anterior and posterior surfaces being related by way of non-axisymmetric thickness variations for orienting the contact lens bodies about the optical axis; and
wavefront modifiers being incorporated into at least one of the anterior and posterior surfaces of the lens bodies and at least partially compensating for a wavefront aberration associated with the non-axisymmetric thickness variations to a common target value for any remaining wavefront aberration among the lens bodies.

18. The batch of claim 17 in which the wavefront aberration associated with the non-axisymmetric thickness variations includes a third-order wavefront aberration, and the common target value among the lens bodies is a predetermined amount of the third-order wavefront aberration.

19. The batch of claim 18 in which the predetermined amount of the common target value among the lens bodies is a substantially zero amount of the third-order wavefront aberration.

20. The batch of claim 18 in which the common target value among the lens bodies is an amount based on a population study to provide a target compensation for a similar third-order aberration exhibited by the population.

21. The batch of claim 18 in which the wavefront aberration is coma and the common target value is a predetermined amount of coma.

22. The batch of claim 17 in which the wavefront modifiers are incorporated into at least one of the anterior and posterior surfaces as non-axisymmetrical surface forms that at least partially compensate for the wavefront aberration associated with the thickness variation.

23. A plurality of contact lenses, comprising:
a plurality of contact lens bodies each incorporating a structural feature contributing a third-order wavefront aberration to wavefront propagations through the contact lens bodies; and
a wavefront modifier incorporated into each of the contact lens bodies contributing a complementary third-order wavefront aberration such that in combination with the third-order wavefront aberration contributed by the structural feature, any residual third-order wavefront aberration is substantially the same among the lens bodies.

24. The contact lenses of claim 23 in which the structural features incorporated into the lens bodies contribute different amounts of the third-order wavefront aberration, but amounts of the residual third-order wavefront aberration remain substantially the same.

25. The contact lenses of claim 23 in which at least some of the lens bodies exhibit different amounts of optical power but exhibit substantially the same amount of the residual third-order wavefront aberration.

26. The contact lenses of claim 23 in which the residual third-order wavefront aberration is substantially null.

27. The contact lenses of claim 23 in which the wavefront modifiers contribute different amounts of coma.

28. The contact lenses of claim 23 in which the structural features provide for orienting the contact lens bodies on wearers' eyes.

29. The contact lenses of claim 28 in which the lens bodies are prism ballasted for orienting the lens bodies on the wearers' eyes, and the wavefront modifiers at least partially compensate for optical aberrations associated with the prism ballasting.

30. The contact lenses of claim 29 in which the wavefront modifiers contribute non-axisymmetrical aberrations with respect to optical axes of the wearers' eyes.

31. The contact lenses of claim 30 in which the wavefront modifiers compensate for vertical coma associated with the prism ballasting.

32. The contact lenses of claim 29 in which the lens bodies include anterior and posterior surfaces, and the wavefront modifiers are formed in one of the anterior and posterior surfaces.

33. The contact lenses of claim 32 in which the wavefront modifiers are formed in the anterior surfaces.

34. The contact lenses of claim 29 in which the wavefront modifiers contribute a plurality of the higher-order aberrations.

35. The contact lenses of claim 34 in which at least one of the higher-order aberrations contributed by the wavefront modifiers is coma.

36. A set of ophthalmic biomedical optics, comprising:
a plurality of focusing optics having bodies adapted for contact with biological tissue;
a non-axisymmetric structural feature of the focusing optic bodies that influences optical transmissions of the lens bodies;
a wavefront modifier that further influences optical transmissions of the focusing optic bodies; and
the wavefront modifier exhibiting a third-order aberration that makes similar improvements to the imaging performance of the focusing optic bodies.

37. The optics of claim 36 in which the non-axisymmetric structural feature contributes a third-order aberration and the wavefront modifier at least partially compensates for the third-order aberration of the orienting feature.

38. The optics of claim 37 in which the wavefront modifier compensates for a plurality of third or other higher-order aberrations to improve imaging performance.

39. The optics of claim 38 in which the wavefront modifier provides corrections for both coma and spherical aberration.

40. The optics of claim 36 in which the focusing optic bodies include anterior and posterior surfaces and the wavefront modifier is formed in one of the anterior and posterior surfaces.

41. The optics of claim 40 in which the wavefront modifier is formed at least in part as a non-axisymmetrical surface.

42. The optics of claim 36 in which the wavefront modifier is formed at least in part by refractive index variations in the focusing optic bodies.

* * * * *